United States Patent [19]

Shimotsuma et al.

[11] Patent Number: 5,221,704

[45] Date of Patent: Jun. 22, 1993

[54] FLAME-RETARDANT RESIN COMPOSITION AND MOLDED ARTICLE FOR ELECTRICAL PARTS

[75] Inventors: Sakae Shimotsuma, Atsugi; Akihiro Suzuoka; Toshio Hatayama, both of Sagamihara, Japan

[73] Assignee: Teijin Limited, Osaka, Japan

[21] Appl. No.: 591,641

[22] Filed: Oct. 2, 1990

[30] Foreign Application Priority Data

Oct. 4, 1989 [JP] Japan .................. 1-257866

[51] Int. Cl.$^5$ ............................ C08K 5/15; C08K 5/13
[52] U.S. Cl. ................................ 524/114; 524/281; 524/436
[58] Field of Search ............... 524/281, 114, 410, 411, 524/412, 424, 373, 399, 436

[56] References Cited

U.S. PATENT DOCUMENTS

| | | | |
|---|---|---|---|
| 4,102,853 | 7/1978 | Kawamura et al. | 524/424 |
| 4,361,623 | 11/1982 | Newkirk et al. | 528/102 |
| 4,362,658 | 12/1982 | Contin | 524/410 |
| 4,562,216 | 12/1985 | Kishida et al. | 524/373 |
| 4,729,854 | 3/1988 | Miyata et al. | 524/436 |
| 4,741,865 | 5/1988 | Kintz et al. | 524/412 |

FOREIGN PATENT DOCUMENTS

| | | |
|---|---|---|
| 0129805 | 1/1985 | European Pat. Off. . |
| 0174826 | 3/1986 | European Pat. Off. . |
| 2374368 | 7/1978 | France . |

*Primary Examiner*—Veronica P. Hoke
*Attorney, Agent, or Firm*—Sughrue, Mion, Zinn, Macpeak & Seas

[57] ABSTRACT

A flame-retardant resin composition comprising (A) polybutylene terephthalate, a copolymer comprising at least 60.0% by weight of butylene terephthalate units and/or a thermoplastic polyester blend comprising at least 60.0% by weight of polybutylene terephthalate, (B) a brominated epoxy resin type flame retardant and/or a brominated polycarbonate type flame retardant, (C) a flame retardant assistant composed mainly of antimony trioxide and/or antimony pentoxide, (D) a hydrous basic carbonate compound of magnesium and aluminum, and (E) optionally an inorganic filler.

This resin composition has an excellent flame retardancy, balanced performances, and an improved molding processability (flowability, molding cycle, mold-staining resistance and the like), and a staining of metals or a formation of decomposition products and volatile substances is controlled when the composition is used for molding electrical parts.

14 Claims, No Drawings

FLAME-RETARDANT RESIN COMPOSITION AND MOLDED ARTICLE FOR ELECTRICAL PARTS

BACKGROUND OF THE INVENTION

(1) Field of the Invention

The present invention relates to a polybutylene terephthalate type flame-retardant resin composition. More particularly, the present invention relates to a resin composition having an excellent flame retardancy, balanced performances, and improved molding processability characteristics (flowability, molding cycle, mold-staining resistance and the like), in which a staining of metals or a formation of decomposition products and volatile substances is controlled when the composition is used for molding electrical parts.

(2) Description of the Related Art

A polybutylene terephthalate homopolymer, a copolymer comprising at least 60% by weight of butylene terephthalate units, and a thermoplastic polyester blend comprising at least 60% by weight of polybutylene terephthalate (collectively called "PBT" hereinafter) are crystalline thermoplastic resins having excellent mechanical properties, electrical properties, physical properties and chemical properties, and accordingly, these PBT resins are widely used as engineering plastics for automobiles, electric appliances, electronic appliances, and the like.

In fields where a flame retardancy is required, for example, for the production of electrical parts and the like, PBT resin compositions which are rendered flame-retardant by an incorporation of an organic halogen type flame retardant, optionally together with a flame retardant assistant, are mainly used.

Nevertheless, the conventional PBT resin compositions comprising a flame retardant and a flame retardant assistant bring the following problems.

(1) The physical properties of the molded article are lowered by the presence of the flame retardant or the assistant used in combination with the flame retardant.

(2) PBT as the base resin is decomposed and deteriorated by the flame retardant or the assistant or the mutual action thereof when the composition is prepared or molded or when the molded article is used in a high-temperature atmosphere.

(3) The mold is contaminated or corroded with the flame retardant or the assistant or a decomposition by-product thereof, and the dimensional precision of the molded article or the processing efficiency is lowered.

(4) Due to the presence of the flame retardant or the assistant or a decomposition by-product thereof, or to the decomposition product of PBT described in (2) above, specks are formed in the molded article, or parts near the molded article are contaminated or discolored, resulting in a poor appearance thereof.

(5) Because of a poor compatibility between the flame retardant and the resin, a bleeding of the flame retardant to the surface of the molded article occurs, which results in the occurrence of various problems.

(6) The flowability of the resin is impeded and molding cannot be performed smoothly.

(7) When the molded article is practically used, metals present contiguously or close to the molded article are corroded or contaminated by the flame retardant or the assistant or a decomposition product thereof, and the functions of parts are impeded. For example, when the resin composition is used for electrical parts having an electric contact composed of a metal (for example, a housing for a switch or relay and a substrate), the contact metal becomes stained after a long period of use, and the electric resistance values of the contacts are drastically lowered.

(8) Because of the mutual action of the flame retardant and assistant when used in combination, the molded article is deteriorated and discolored under ultraviolet rays and the appearance and strength characteristics are poor. For example, when the resin composition is used for electrical parts generating ultraviolet rays (for example, a housing or holder of a fluorescent lamp), a deterioration or discoloration occurs, or a formation or adhesion of a decomposition product as mentioned in (4) above occurs, resulting in a spoiling of the appearance thereof.

Solutions to these problems have been independently proposed, and some of the problems have been satisfactorily solved. Nevertheless, it is still difficult to obtain a flame-retardant PBT composition in which all of the foregoing problems are fully resolved, and there is a strong demand for such a composition.

In general, PBT is molded and processed more easily than polyethylene terephthalate. Currently, however, there is often a need to further reduce the manufacturing cost of a molded article, and in particular, to improve the productivity by shortening the molding cycle (realization of so-called high-cycle molding).

SUMMARY OF THE INVENTION

The inventors carried out research with a view to obtaining a flame-retardant PBT composition having an excellent flame retardancy and well-balanced performances, and having none of the above-mentioned defects, in which the molding cycle can be shortened and a high-cycle molding is possible, and the occurrence of problems such as a contamination of metal, deterioration under ultraviolet rays, and formation of decomposition products and volatile substances in a high-temperature atmosphere can be prevented, and as a result, completed the present invention.

More specifically, in accordance with a fundamental aspect of the present invention, there is provided a flame-retardant resin composition comprising (A) polybutylene terephthalate, a copolymer comprising at least 60.0% by weight of butylene terephthalate units and/or a thermoplastic polyester blend comprising at least 60.0% by weight of polybutylene terephthalate, (B) 2.0 to 25.0% by weight, based on the total composition, of a brominated epoxy resin type flame retardant and/or a brominated polycarbonate type flame retardant, (C) 2.0 to 15.0% by weight, based on the total composition, of flame retardant assistant composed mainly of antimony trioxide and/or antimony pentoxide, (D) 0.01 to 10.0% by weight, based on the total composition, of a hydrous basic carbonate compound of magnesium and aluminum, and (E) 0 to 70.0% by weight, based on the total composition, of an inorganic filler.

In accordance with one preferred embodiment of the present invention, there is provided a flame-retardant resin composition as set forth above, which further comprises (F) an alkali metal salt or an alkaline earth metal salt. According to this preferred embodiment, the intended effects of improving performances can be enhanced.

DESCRIPTION OF THE PREFERRED EMBODIMENTS

The constituent ingredients of the resin composition will now be described in detail.

Polybutylene terephthalate obtained by polycondensing 1,4-butanediol with terephthalic acid or a lower alcohol ester thereof is used as the PBT resin (A) in the present invention. A copolymer comprising at least 60% by weight of butylene terephthalate units can also be used. As the comonomer to be copolymerized with butylene terephthalate, there can be mentioned aliphatic and aromatic polybasic acids and ester-forming derivatives thereof, such as isophthalic acid, naphthalenedicarboxylic acid, adipic acid, sebacic acid, trimellitic acid and succinic acid, aromatic hydroxycarboxylic acids and ester-forming derivatives thereof, such as hydroxybenzoic acid and hydroxynaphthoic acid, lower alkylene glycols such as 1,3-propanediol, 1,6-hexanediol and 1,8-octanediol, aromatic alcohols such as bisphenol A and 4,4'-dihydroxybiphenyl, alkylene oxide adducts to alcohols, such as 2-mole ethylene oxide adduct to bisphenol A and 2-mole propylene oxide adduct to bisphenol A, and polyhydroxyl compounds and ester-forming derivatives thereof, such as glycerol and pentaerythritol. Moreover, a thermoplastic polyester blend comprising at least 60% by weight of polybutylene terephthalate can be used. Namely, thermoplastic polyesters comprising the above-mentioned acid component, glycol component and hydroxycarboxylic acid component can be incorporated into polybutylene terephthalate, as long as the physical properties are not substantially lowered. As the thermoplastic polyester to be blended with polybutylene terephthalate, there can be mentioned polyethylene terephthalate, polyethylene isophthalate, polyethylene naphthoate, polybutylene naphthoate and polycyclohexane-dimethanol terephthalate.

A butylene terephthalate homopolymer is especially preferably used. If the concentration of terminal carboxylate groups of this polybutylene terephthalate is reduced, the resistance to hydrolysis and the resistance to wet thermal deterioration can be further improved in the resin composition of the present invention.

The flame retardant as the component (B) to be incorporated into the PBT resin (A) is a brominated epoxy resin type flame retardant and/or a brominated polycarbonate type flame retardant.

The brominated epoxy resin type flame retardant comprises 100 parts by weight of a brominated bisphenol A type epoxy resin having a bromine content of at least 20% by weight, which is represented by the following general formula (I) and/or a modification product thereof in which a part or all of terminal glycidyl groups are blocked:

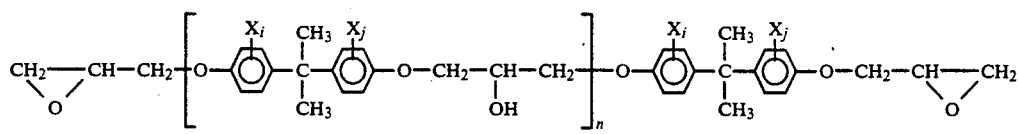

(I)

wherein X represents a bromine atom, i and j each represent an integer of from 1 to 4, and n represents the polymerization degree which is in the range of from 0 to 40, and 0.1 to 50 parts by weight of a polyalkylene ether derivative of a bromine-containing bisphenol having an alcoholic hydroxy group, which is represented by the following general formula (II):

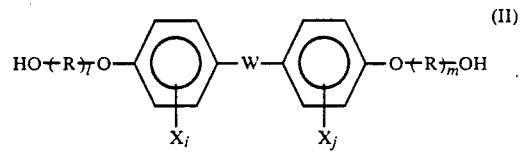

(II)

wherein X, i and j are as defined above, R represents ethylene-oxy group, an isopropylene-oxy group or a butylene-oxy group, l and m each represent an integer of from 1 to 5, and W represents —CH$_2$—,

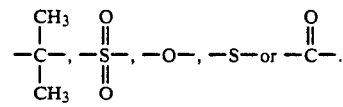

As the brominated bisphenol A type epoxy resin having a bromine content of at least 20% by weight, which is represented by the general formula (I) and/or the modification product thereof, in which a part or all of terminal glycidyl groups are blocked, there can be mentioned epoxy resins obtained by reacting brominated bisphenol A with epichlorohydrin, mixing the obtained brominated bisphenol A diglycidyl ether with brominated bisphenol A so that the amount of the hydroxyl group of the brominated bisphenol A is 0 to 0.96 equivalent per equivalent of the epoxy group of the brominated bisphenol A diglycidyl ether, and heat-reacting the mixture at 100° to 250° C. in the presence of a basic catalyst such as sodium hydroxide, lithium hydroxide or tributylamine, and/or modification products thereof in which a part or all of terminal epoxy groups in such epoxy resins are blocked with a carboxylic acid, an alcohol, a phenol or an amine. Epoxy resins having an average polymerization degree n of from 3 to 20 are preferably used because an excellent balance is obtained thereby between the flame retardancy and the mechanical strength. As the brominated bisphenol A used for the formation of the above-mentioned epoxy resins, there can be mentioned monobromobisphenol A, dibromobisphenol A, tribromobisphenol A and tetrabromobisphenol A. Among them, tetrabromobisphenol A is especially preferably used.

The polyalkylene ether derivative of the bromine-containing bisphenol A having an alcoholic hydroxyl group, which is represented by the general formula (II), exerts an effect of inhibiting gelation of the component (I) and a flame-retardant effect, and the component (II) is used in combination with the component (I) for improving the flow stability (melt viscosity stability) of the flame-retardant polyester resin composition of the present invention. As specific examples of the component (II), there can be mentioned reaction products obtained by adding ethylene oxide, propylene oxide, butylene oxide or a polymer thereof to both the terminal hydroxyl groups of a brominated bisphenol compound such as bromine-containing bisphenol F, bisphenol A or bisphenol S, and an ethylene oxide adduct to tetrabromobisphenol A (hereinafter referred to as "TBA-EO") is especially preferably used. If the amount used of the component (II) is smaller than 0.1 part by weight per 100 parts by weight of the component (I), a substantial flow-stabilizing effect is not obtained in the resin composition and an increase of the viscosity becomes conspicuous. If the amount of the component (II) is larger than 50 parts per 100 parts by weight of the component (I), the mechanical characteristics are lowered and the flame retardancy becomes poor, and thus good results cannot be obtained.

When this brominated epoxy resin type flame retardant is used for the flame-retardant resin composition to be molded into an electrical part having an electric contact composed of a metal, a high flowability, a high molding processability, and a high resistance to the mold corrosion can be obtained, and furthermore, there can be obtained an effect of preventing corrosion and contamination of metals present contiguously or close to the electrical part and an effect of preventing an increase of the electric resistance value of the contact.

The brominated polycarbonate type flame retardant as the component (B) is a brominated bisphenol A type polycarbonate resin having a bromine content of at least 20% by weight, which is represented by the following general formula (III):

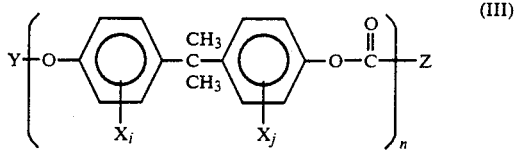

wherein X represents a bromine atom, i and j each represent an integer of from 1 to 4, n represents the average polymerization degree, which is in the range of from 2 to 30, and Y and Z each represent a terminal group, for example, Y is

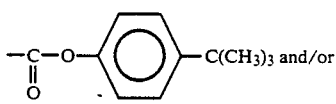

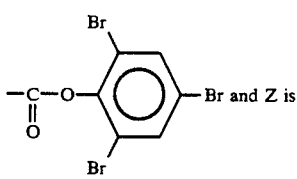

and Z is

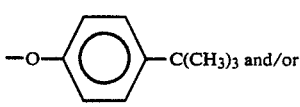

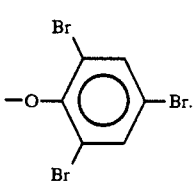

The terminal structure is not particularly critical, but a structure having a 4-tert-butylphenol group or a 2,4,6-tribromophenol group can be preferably adopted.

When the brominated polycarbonate type flame retardant is used for a flame-retardant resin to be molded into a housing or holder of a fluorescent lamp which generates ultraviolet rays and is placed in a high-temperature atmosphere, deterioration by ultraviolet rays or a reduction of the strength is controlled, the formation of decomposition products or volatile substances is prevented, and a spoiling of the appearance of adjoining parts is prevented.

The content of the component (B) is 2 to 25% by weight, preferably 5 to 20% by weight, based on the total composition. If the content of the component (B) is too high, the mechanical and physical properties and the heat stability are lowered, and the appearance and moldability of the resin becomes poor. If the content of the component (B) is too low, the flame retardancy is too low and the heat stability and moldability are poor.

The amount added of the flame retardant assistant (C) composed mainly of antimony trioxide and/or antimony pentoxide, which is used in the present invention, is 2 to 15% by weight, preferably 3 to 10% by weight, based on the total composition. If the amount of the component (C) is too large, a decomposition of the resin and additives is promoted, and if the component (C) is too small, the flame retardancy becomes poor.

The flame retardant assistant composed mainly of antimony pentoxide is represented by the following general formula (IV):

$$(Na_2O)_p \cdot Sb_2O_5 \cdot qH_2O \qquad (IV)$$

wherein p is a number of from 0.4 to 0.9, and q represents the number of moles of water of crystallization, which is in the range of from 0 to 4.

When the brominated epoxy resin type flame retardant is used as the component (B), antimony trioxide and/or the assistant composed mainly of antimony pentoxide, which is represented by the formula (IV), can be used in combination with the flame retardant. On the other hand, when the brominated polycarbonate type flame retardant is used as the component (B), antimony trioxide is preferably used. If the assistant of the formula (IV) is employed, decomposition of the carbonate group is easily promoted and the resin composition is decomposed and foamed, resulting in a lowering of the mechanical and physical properties and the heat stability.

The component (D) used in the present invention is a natural or synthetic hydrotalcite compound represented by the formula of $Mg_6Al_2(OH)_{16}CO_3 \cdot 4H_2O$, $Mg_{4.2}Al_2(OH)_{12.4}CO_3 \cdot m'H_2O$ or $Mg_{4.5}Al_2(OH)_{13} \cdot 3.5H_2O$. Accordingly, the component (D) can be represented by the following general formula (V):

$$Mg_{1-x}Al_x(OH)_2(CO_3)_{x/2} \cdot kH_2O \qquad (V)$$

wherein x is a number of from 0.2 to 0.4 and k is a number smaller than 2.

The content of the component (D) is 0.01 to 10.0% by weight, preferably 0.1 to 7.0% by weight, based on the total composition. If the content of the component (D) is too large, decomposition of PBT or the flame retardant is promoted, and if the content of the component (D) is too low, the effect of controlling the decomposition is too low.

In the present invention, to obtain a molded article having an excellent mechanical strength, heat resistance, dimensional stability (deformation resistance and warp resistance), and electric properties, preferably the inorganic filler (E) is incorporated into the resin composition. A fibrous, particulate or plate-shaped filler is used to obtain this object.

As the fibrous filler, there can be mentioned inorganic fibrous substances, for example, glass fiber, carbon fiber, silica fiber, silica/alumina fiber, zirconia fiber, boron nitride fiber, silicon nitride fiber, boron fiber, potassium titanate fiber, and fibers of metals such as stainless steel, aluminum, titanium, copper and brass. Glass fiber or carbon fiber is typically used as the inorganic fibrous filler. Furthermore, a high-melting-point organic fibrous filler composed of a polyamide or an acrylic resin can be used.

As the particulate filler, there can be mentioned carbon black, silica, quartz powder, glass bead, silicates such as calcium silica, aluminum silicate, kaolin, talc, clay, diatomaceous earth and wollastonite, metal oxides such as iron oxide, titanium oxide, zinc oxide and alumina, metal carbonates such as calcium carbonate and magnesium carbonate, metal sulfates such as calcium sulfate and barium sulfate, and silicon carbide, silicon nitride, boron nitride, and various metal powders.

As the plate-shaped filler, there can be mentioned mica, glass flake, and various metal foils.

These inorganic fillers can be used alone or as a mixture of two or more thereof. A combined use of a fibrous filler, especially glass fiber, and a particulate filler and/or a plate-shaped filler is preferable for obtaining an excellent mechanical strength, dimensional precision, and electrical properties.

When the filler is used, a converging agent or surface-treating agent is preferably used according to need. For example, there can be used polyfunctional compounds such as epoxy compounds, isocyanate compounds, silane compounds and titanate compounds. These compounds are used for the surface treatment or converging treatment in advance, or can be added at the step of mixing the respective components.

In the present invention, the inorganic filler is incorporated in an amount of 0 to 70% by weight, preferably 5 to 60% by weight, based on the total composition. If the amount incorporated of the inorganic filler exceeds 70% by weight, molding becomes difficult and a problem arises in connection with the mechanical strength of the molded article. The amount of the functional surface-treating agent used in combination with the inorganic filler is 1 to 10% by weight, preferably 0.05 to 5% by weight, based on the inorganic filler.

The most characteristic feature of the present invention resides in the synergistic effect obtained by the following four components, i.e., (A) PBT (B) the brominated epoxy resin type flame retardant and/or the brominated polycarbonate type flame retardant, (C) the flame retardant assistant composed mainly of antimony trioxide and/or antimony pentoxide, and (D) the hydrous basic carbonate compound of magnesium or aluminum. If any one of these four components is not incorporated or is replaced by another substance, the excellent effects of the present invention cannot be obtained.

More specifically, if the flame retardant as the component (B) of the present invention is used in combination with the flame retardant assistant as the component (C), a high flame retardancy can be imparted to the PBT resin, but if only the components (B) and (C) are incorporated, a decomposition of PBT and organic additives such as the flame retardant occurs, and a corrosion or contamination of a metal of a molded electrical part and a corrosion or contamination of a mold occur. As a result of the inventor's research, it was found that a decomposition of organic additives can be controlled by further incorporating the component (D).

Even if the above-mentioned resin composition of the present invention is directly used as a flame-retardant PBT composition, a much better mechanical properties and heat stability are manifested than those of conventional known flame retardant-incorporated PBT compositions, and excellent effects can be obtained in the molding cycle and the resistance to the contamination of metals. If an alkali metal salt or alkaline earth metal is further incorporated as the component (F) in addition to the above-mentioned components (A) through (E), these effects are further enhanced.

Nevertheless, where the brominated polycarbonate type flame retardant is used as the component (B), the addition of the component (F) is not preferred because there is a risk of decomposition or foaming.

As the alkali metal salt or alkaline earth metal salt used as the component (F), there can be mentioned organic acid salts of metals such as Li, Na, K, Be, Mg and Ca, and potassium acetate is especially preferably used. The amount incorporated of the metal salt (F) is 0 to 2.0% by weight, preferably 0.005 to 1.0% by weight, based on the total composition. If the metal salt (F) is incorporated in too large an amount, decomposition of PBT or the flame retardant is promoted. If the amount of the metal salt (F) is too small, the manifested effect is too low.

By the addition of the metal salt (F) can be obtained the effects of controlling a decomposition of PBT or the flame retardant, improving the mechanical strength of the resin, and improving the moldability.

Namely, in the composition of the present invention, the component (F) controls the decomposition of the components (A) and (B) and shows a synergistic action to the effect of controlling decomposition of PBT by the component (C), and the component (F) prevents a corrosion or contamination of the mold at the molding step to contribute to an increase of the molding efficiency. Moreover, the component (F) effectively prevents a corrosion or contamination of a metal of an electrical part or like contiguous to the molded article used at a high temperature and prevents a discoloration or deterioration or a formation of decomposition products or volatile substances under irradiation with ultraviolet rays or in a high-temperature atmosphere.

A small amount of a thermoplastic resin can be incorporated as an auxiliary component into the composition of the present invention. For example, an ethylene/acrylic acid ester copolymer, a polyamide, a polyacetal, polystyrene, a styrene/butadiene copolymer, a styrene/butadiene/acrylonitrile copolymer, a styrene/butadiene/acrylic acid (or an ester thereof) copolymer, a styrene/acrylonitrile copolymer, a polycarbonate, a polyurethane, polyphenylene oxide, polybutadiene, a halogenated polyolefin, a polyvinyl halide, a butyl rubber and a multi-layer grafted copolymer composed mainly of a polyacrylate can be incorporated at optional ratios according to the intended objects.

Of course, known additives other than the above-mentioned components, such as lubricants, nucleating agents, release agents, antistatic agents, other surface active agents, plasticizers, colorants, heat-resistant stabilizers and ultraviolet ray stabilizers can be incorporated into the resin composition of the present invention for imparting desirable characteristics according to the intended objects.

The composition of the present invention can be prepared by known equipment and methods customarily used for the preparation of resin compositions. For example, there can be adopted i) a method in which the respective components are mixed, the mixture is kneaded and extruded by an extruder to form a pellet, and the pellet is molded; ii) a method in which pellets differing in composition are once prepared, predetermined amounts of the pellets are mixed, and the mixture is molded to obtain a molded article having the intended composition; and iii) a method in which at least one of the respective components is directly charged into the molding machine. A method in which a part of the resin component is finely divided, the fine powder is mixed with other components, and the mixture is added to the remainder of the resin component is preferably adopted, because the respective components are homogeneously incorporated.

The flame-retardant PBT resin composition of the present invention is molded into various articles for which a flame retardancy is required. When the resin composition of the present invention is used for electrical parts, particularly electrical and electronic parts having electrical contacts composed of metals, such as switches relays, or electrical parts generating ultraviolet rays, such as housings and holders of illuminating devices such as fluorescent lamps, especially high effects can be obtained.

The present invention will now be described in detail with reference to the following examples, that by no means limit the scope of the invention.

In the examples, the properties and characteristics were determined according to methods described below.

(1) Physical Properties

The tensile test was carried out according to ASTM D-638 and the Izod impact strength was determined according to ASTM D-256.

(2) Residence Test in Molding Machine (Heat Stability)

A sample was maintained in a cylinder of a molding machine at a cylinder temperature of 260° C. for 30 minutes, and the sample was then molded. The tensile strength of the molded test piece was measured, and the heat stability and the degree of deterioration were evaluated.

(3) Combustion Test (UL-94)

According to the method of Subject 94 (UL-94) of Underwriters' Laboratories, the flame retardancy was tested by using five test pieces (thickness: 1/32 inch).

(4) Measurement of Flowability

By using a rod flow length-measuring test mold (cavity: 20 mm in width and 2.0 mm in thickness), molding was carried out under the conditions described below and the flowability was evaluated based on the flow length (length of the molded article).

Molding Conditions

Cylinder temperature: 250° C.
Injection pressure: 1000 kg/cm$^2$
Mold temperature: 60° C.

(5) Critical Molding Cycle

Molding was carried out under the conditions described below to obtain a bottomed cylindrical molded article (having an outer diameter of 40 mm, a height of 40 mm and an average thickness of 5 mm), and the critical time (seconds) of the molding cycle required for obtaining a molded article having a good appearance without deformation of the molded article was determined. A smaller value indicates a better high-cycle moldability.

Molding Conditions

Cylinder Temperature: 250° C.
Injection Pressure: 1400 kg/cm$^2$
Mold Temperature: 90° C.
Molding cycle: the injection pressure-maintaining time was kept constant and the cooling time was measured

(6) Inspection of Appearance of Molded Article

A disc (having a diameter of 100 mm and a thickness of 3 mm) was molded, and the presence or absence of specks differing in color, and the degree of formation of the specks, were checked with the naked eye and the evaluation made according to the following rank:
O: no specks
Δ: few specks
X: many specks

(7) Evaluation of Contamination of Metal

A sample (pellet) was dried, and 50 g of the pellet was sealed in a glass tube together with a silver piece (15 mm × 2 mm × 0.2 mm) and was heated at 200° C. for 200 hours. The discoloration thereof was observed and evaluated according to the following rank:
O: no discoloration
Δ: slight discoloration
X: conspicuous discoloration

(8) Discoloration Under Ultraviolet Rays

A disc (having a diameter of 50 mm and a thickness of 2 mm) was molded and irradiated with ultraviolet rays having a wavelength of 254 nm and an intensity of 1600 μW/cm$^2$ in an atmosphere maintained at 130° C. The yellow index (YI) was measured by using a color machine and the discoloration degree was evaluated based on the yellow index.

(9) Decomposition of Resin in High-Temperature Atmosphere

A molded test piece (40 mm × 13 mm × 0.9 mm) was sealed in a glass tube and heat-treated at 170° C. for 25 days. The amount of decomposition product formed was measured.

(10) Concentration of Terminal Carboxyl Group (COOH)

The terminal carboxyl group concentration (equivalent per $10^6$ g) was measured by the method of A. Conix [Makromol. Chem., 26, 226 (1958)].

(11) Resistance to Wet Heat Deterioration

The same measurement test piece as described in (1) above was subjected to the wet heat deterioration at a temperature of 125° C. and a relative humidity of 100% for 48 hours in a pressure cooker testing machine, and the tensile strength was measured. The retention ratio to the value measured before the treatment was determined, and the resistance was evaluated based on this retention ratio.

(12) Amount of Bromine Generated

A cylindrical glass vessel was arranged in a passage in which air heated at 300° C. was circulated, a sample resin was sealed in the glass vessel, and the glass vessel was immersed in an oil bath maintained at 300° C. Circulated air was introduced into pure water and generated bromine was collected as HBr for 1 hour. The weight (ppm) of generated HBr in the obtained aqueous solution based on the sealed resin was measured by the ion chromatography.

EXAMPLES 1 THROUGH 8 AND COMPARATIVE EXAMPLES 1 THROUGH 9

Components shown in Tables 1-1 and 1-2 were mixed with PBT and a brominated epoxy resin flame retardant, and the mixture was formed into a pelletized composition by using an extruder. The pellet was molded into various test pieces, and the above-mentioned evaluation tests were carried out. The results are shown in Tables 1-1 and 1-2.

PBT used was a homopolymer having an intrinsic viscosity of 0.88, and the brominated epoxy resin type flame retardant used was synthesized in the following manner.

A 1-liter separable 4-neck flask equipped with stirring blades was charged with 744 g of tetrabromobisphenol A diglycidyl ether (having an epoxy equivalent of 372, a bromine content of 48.0%, a softening point of 60° C. and an average polymerization degree n of 0.1), 477 g of tetrabromobisphenol A and 0.57 g of a 10% aqueous solution of NaOH, and the mixture was heated and reacted at 160° to 200° C. for 5 hours in a nitrogen current. After the reaction, the reaction product was withdrawn on a stainless steel pan and cooled and solidified, and the solid was pulverized to obtain a light yellow powder of a brominated bisphenol A type epoxy resin, which was characterized by a bromine content of 52.2%, a softening point of 180° C., a weight average molecular weight (GPC analysis value) of 10000, and an average polymerization degree n of 15.

The hydrotalcite compound used was a compound of the above-mentioned formula (V), in which x was 0.32 and m was zero, i.e., a compound of the formula of $Mg_{0.68}Al_{0.32}(OH)_2(CO_3)_{0.16}$.

TABLE 1-1

| | Unit | Example 1 | Example 2 | Example 3 | Example 4 | Example 5 | Example 6 | Example 7 | Example 8 |
|---|---|---|---|---|---|---|---|---|---|
| Composition | | | | | | | | | |
| (A) PBT ([COOH] = 60 equivalent/$10^6$ g) | | 53.9 | 53.9 | 54.0 | 54.0 | 54.0 | 54.0 | 54.0 | |
| PBT ([COOH] = 16 equivalent/$10^6$ g) | | | | | | | | | 54.0 |
| (B) brominated epoxy type flame retardant | | | | | | | | | |
| brominated epoxy resin | | 8.8 | 8.8 | 8.8 | 8.8 | 8.8 | 9.8 | 6.0 | 8.8 |
| TBA-EO | | 1.2 | 1.2 | 1.2 | 1.2 | 1.2 | 0.2 | 4.0 | 1.2 |
| brominated polycarbonate type flame retardant | | | | | | | | | |
| (C) $(Na_2O)_{0.7}Sb_2O_5$ | | 5.0 | 5.0 | 5.0 | | | 5.0 | 5.0 | 5.0 |
| $(Na_2O)_{0.5}Sb_2O_5$ | | | | | 5.0 | | | | |
| $Sb_2O_5$ | | | | | | | | | |
| $NaSbO_3$ ($Na_2O.Sb_2O_5$) | | | | | | | | | |
| $Sb_2O_3$ | | | | | | 5.0 | | | |
| (D) hydrotalcite compound | | 1.0 | 1.0 | 1.0 | 1.0 | 1.0 | 1.0 | 1.0 | 1.0 |
| (E) glass fiber | | 30.0 | 30.0 | 30.0 | 30.0 | 30.0 | 30.0 | 30.0 | 30.0 |
| (F) potassium acetate | | 0.1 | — | — | | | | | |
| sodium oxalate | | — | 0.1 | — | | | | | |
| Quality (physical properties) | | | | | | | | | |
| tensile strength | Kg/cm$^2$ | 1770 | 1610 | 1620 | 1600 | 1570 | 1580 | 1440 | 1690 |
| tensile elongation | % | 5.6 | 5.8 | 5.4 | 5.3 | 5.6 | 5.1 | 4.9 | 5.4 |
| unnotched Izod impact strength | Kg cm/cm | 98 | 90 | 92 | 89 | 88 | 85 | 78 | 95 |
| residence test in molding machine (tensile strength) | Kg/cm$^2$ | 1350 | 1180 | 1230 | 1330 | 1120 | 980 | 870 | 1180 |
| combustion test (UL-94) | — | V-0 | V-0 | V-0 | V-0 | V-0 | V-0 | V-0 | V-0 |
| critical molding cycle (cooling time) | second | 6 | 6 | 6 | 6 | 6 | 6 | 8 | 6 |
| flowability | mm | 350 | 410 | 440 | 410 | 480 | 130 | 680 | 210 |
| appearance inspection (specks) | — | ○ | Δ | ○ | ○ | ○ | ○ | ○ | ○ |
| discoloration of silver piece | — | ○ | ○ | ○ | ○ | ○ | Δ | Δ | Δ | ○ |
| wet heat deterioration (tensile strength retention ratio) | Kg/cm$^2$ | 65 | 61 | 68 | 57 | 51 | 43 | 44 | 90 |
| amount generated of bromine | ppm by weight | 110 | 240 | 140 | 290 | 390 | 620 | 460 | 180 |

TABLE 1-2

| | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Composition | | | | | | | | | | |
| (A) PBT ([COOH] = 60 equivalent/$10^6$ g) | | 55.0 | 54.9 | 54.0 | 55.0 | 58.0 | 42.0 | 55.0 | 55.0 | |
| PBT ([COOH] = 16 equivalent/$10^6$ g) | | | | | | | | | | 55.0 |
| (B) brominated epoxy resin type flame retardant | | | | | | | | | | |
| brominated epoxy resins | | 8.8 | 8.8 | 8.8 | 8.8 | 8.8 | 8.8 | 10.0 | 10.0 | 8.8 |
| TBA-EO | | 1.2 | 1.2 | 1.2 | 1.2 | 1.2 | 1.2 | | | 1.2 |

TABLE 1-2-continued

|  | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| brominated polycarbonate type flame retardant |  |  |  |  |  |  |  |  |  |  |
| (C) $(Na_2O)_{0.7}Sb_2O_5$ |  | 5.0 | 5.0 |  |  | 1.0 | 5.0 | 5.0 |  | 5.0 |
| $(Na_2O)_{0.5}Sb_2O_5$ |  |  |  |  |  |  |  |  |  |  |
| $Sb_2O_5$ |  |  |  | 5.0 |  |  |  |  |  |  |
| $NaSbO_3 (Na_2O.Sb_2O_5)$ |  |  |  |  | 5.0 |  |  |  |  |  |
| $Sb_2O_3$ |  |  |  |  |  |  |  |  | 5.0 |  |
| (D) hydrotalcite compound |  |  |  |  |  | 1.0 | 13.0 |  |  |  |
| (E) glass fiber |  | 30.0 | 30.0 | 30.0 | 30.0 | 30.0 | 30.0 | 30.0 | 30.0 | 30.0 |
| (F) potassium acetate |  |  | 0.1 |  |  |  |  |  |  |  |
| sodium oxalate |  |  |  |  |  |  |  |  |  |  |
| Quality (physical properties) |  |  |  |  |  |  |  |  |  |  |
| tensile strength | Kg/cm² | 1460 | 1510 | 1450 | 1570 | 1350 | 1250 | molding impossible because of increase of viscosity and gelation of resin | molding impossible because of increase of viscosity and gelation of resin | 1410 |
| tensile elongation | % | 3.8 | 4.4 | 4.7 | 5.5 | 4.5 | 2.3 |  |  | 3.5 |
| unnotched Izod impact strength | Kg cm/cm | 71 | 76 | 68 | 72 | 70 | 47 |  |  | 72 |
| residence test in molding machine (tensile strength) | Kg/cm² | 930 | 960 | 860 | 780 | 670 | 320 |  |  | 890 |
| combustion test (UL-94) | — | — | V-0 | V-1 | V-2 | V-2 | HB | V-2 |  | V-0 |
| critical molding cycle (cooling time) | second | 8 | 8 | 10 | 8 | 15 | 16 |  |  | 9 |
| flowability | mm | 320 | 280 | 400 | 430 | 520 | 1250 |  |  | 230 |
| appearance inspection (specks) | — | ○ | △ | △ | △ | x | •x |  |  | △ |
| discoloration of silver piece | — | x | x | x | x | x | x |  |  | x |
| wet heat deterioration (tensile strength retention ratio) | Kg/cm² | 44 | 41 | 38 | 35 | 39 | 23 |  |  | 81 |
| amount generated of bromine | ppm by weight | 1170 | 1240 | 1350 | 1580 | 2500 | 3200 |  |  | 1320 |

EXAMPLES 9 THROUGH 18 AND COMPARATIVE EXAMPLES 10 THROUGH 15

A PBT homopolymer, copolymer or mixture was mixed with additives shown in Tables 2-1 and 2-2, and the resin composition was evaluated in the same manner as described in Examples 1 through 8 and Comparative Examples 1 through 9. The results are shown in Tables 2-1 and 2-2.

The PBT copolymer comprised 30% of polyethylene terephthalate (PET) and 70% of PBT, and was obtained by copolymerizing 7% by weight (based on the total polymer) of ethylene glycol (EG) according to customary procedures. Furthermore, a copolymer comprising 44% of PET and 56% of PBT, which was obtained by copolymerizing 10% by weight of EG, was used. The PBT mixture used comprised PBT having an intrinsic viscosity of 0.88 and polyethylene terephthalate (PET) having an intrinsic viscosity of 0.70 at an optional ratio.

The brominated epoxy resin type flame retardant used was a mixture comprising 88 parts of the brominated epoxy resin and 12 parts of TBA-EQ.

TABLE 2-1

|  | Unit | Example 9 | Example 10 | Example 11 | Example 12 | Example 13 | Example 14 | Example 15 | Example 16 |
|---|---|---|---|---|---|---|---|---|---|
| Composition |  |  |  |  |  |  |  |  |  |
| (A) PBT ([COOH] = 60 equivalent/10⁶ g) |  | 67.0 |  |  | 67.0 |  |  | 76.5 | 77.0 |
| PBT/PET = 70/30 copolymer |  |  | 67.0 |  |  |  |  |  |  |
| PBT/PET = 56/44 copolymer |  |  |  |  |  | 67.0 |  |  |  |
| PBT/PET = 70/30 mixture |  |  |  | 67.0 |  |  | 67.0 |  |  |
| PBT/PET = 30/70 mixture |  |  |  |  |  |  |  |  |  |
| (B) brominated epoxy resin type flame retardant |  |  |  |  | 12.0 | 12.0 | 12.0 | 13.0 | 13.0 |
| brominated polycarbonate type flame retardant |  | 12.0 | 12.0 | 12.0 |  |  |  |  |  |
| (C) $(Na_2O)_{0.7}Sb_2O_5$ |  |  |  |  | 5.0 | 5.0 | 5.0 | 5.0 | 5.0 |
| $Sb_2O_5$ |  |  |  |  |  |  |  |  |  |
| $NaSbO_3 (Na_2O.Sb_2O_5)$ |  |  |  |  |  |  |  |  |  |
| $Sb_2O_3$ |  | 5.0 | 5.0 | 5.0 |  |  |  |  |  |
| (D) hydrotalcite compound |  | 1.0 | 1.0 | 1.0 | 1.0 | 1.0 | 1.0 | 5.0 | 5.0 |
| (E) glass fiber |  | 15.0 | 15.0 | 15.0 | 15.0 | 15.0 | 15.0 |  |  |
| (F) potassium acetate |  |  |  |  |  |  |  | 0.5 |  |
| Quality (physical properties) |  |  |  |  |  |  |  |  |  |
| tensile strength | Kg/cm² | 1080 | 1100 | 1140 | 1120 | 1140 | 1140 | 680 | 620 |
| tensile elongation | % | 4.7 | 4.7 | 4.5 | 5.0 | 5.0 | 5.1 | 25 | 23 |
| unnotched Izod impact strength | Kg cm/cm | 42 | 42 | 40 | 45 | 44 | 46 | 36 | 29 |
| residence test in molding machine | Kg/cm² | 880 | 840 | 800 | 920 | 900 | 890 | 420 | 450 |

TABLE 2-1-continued

|  | Unit | Example 9 | Example 10 | Example 11 | Example 12 | Example 13 | Example 14 | Example 15 | Example 16 |
|---|---|---|---|---|---|---|---|---|---|
| (tensile strength) |  |  |  |  |  |  |  |  |  |
| combustion test (UL-94) | — | V-0 | V-0 | V-0 | V-0 | V-0 | V-0 | V-0 | V-0 |
| critical molding cycle (cooling time) | second | 8 | 9 | 8 | 6 | 6 | 6 | 10 | 12 |
| flowability | mm | 420 | 400 | 400 | 480 | 460 | 460 | 610 | 790 |
| appearance inspection (specks) | — | ○ | ○ | ○ | ○ | ○ | ○ | ○ | ○ |
| discoloration of silver piece | — | Δ | Δ | Δ | ○ | ○ | ○ | ○ | ○ |
| discoloration under UV | YI | 27 | 28 | 28 | 55 | 56 | 55 | 58 | 59 |
| resin decomposition product |  | small | small | small | small | small | small | very small | very small |

TABLE 2-2

|  | Unit | Example 17 | Example 18 | Comparative Example 10 | Comparative Example 11 | Comparative Example 12 | Comparative Example 13 | Comparative Example 14 | Comparative Example 15 |
|---|---|---|---|---|---|---|---|---|---|
| Composition |  |  |  |  |  |  |  |  |  |
| (A) PBT ([COOH] = 60 equivalent/$10^6$ g) |  | 67.0 | 67.0 | 67.0 | 66.9 |  |  |  |  |
| PBT/PET = 70/30 copolymer |  |  |  |  |  |  |  |  |  |
| PBT/PET = 56/44 copolymer |  |  |  |  |  | 67.0 |  | 67.0 |  |
| PBT/PET = 70/30 mixture |  |  |  |  |  |  |  |  |  |
| PBT/PET = 30/70 mixture |  |  |  |  |  |  | 67.0 |  | 67.0 |
| (B) brominated epoxy resin type flame retardant |  |  |  |  |  |  |  | 12.0 | 12.0 |
| brominated polycarbonate type flame retardant |  | 12.0 | 12.0 | 12.0 | 12.0 | 12.0 | 12.0 |  |  |
| (C) $(Na_2O)_{0.7}Sb_2O_5$ |  | 5.0 |  |  |  |  |  | 5.0 | 5.0 |
| $Sb_2O_5$ |  |  | 5.0 |  |  |  |  |  |  |
| $NaSbO_3 (Na_2O \cdot Sb_2O_5)$ |  |  |  | 5.0 |  |  |  |  |  |
| $Sb_2O_3$ |  |  |  |  | 5.0 | 5.0 | 5.0 |  |  |
| (D) hydrotalcite compound |  | 1.0 | 1.0 | 1.0 | 1.0 | 1.0 | 1.0 | 1.0 | 1.0 |
| (E) glass fiber |  | 15.0 | 15.0 | 15.0 | 15.0 | 15.0 | 15.0 | 15.0 | 15.0 |
| (F) potassium acetate |  |  |  |  | 0.1 |  |  |  |  |
| Quality (physical properties) |  |  |  |  |  |  |  |  |  |
| tensile strength | Kg/cm$^2$ | 1070 | 1070 | molding impossible because of foaming of resin | molding impossible because of foaming of resin | 820 | 860 | 830 | 860 |
| tensile elongation | % | 4.6 | 4.4 |  |  | 2.6 | 3.2 | 3.5 | 4.0 |
| unnotched Izod impact strength | Kg cm/cm | 40 | 42 |  |  | 24 | 28 | 26 | 30 |
| residence test in molding machine (tensile strength) | Kg/cm$^2$ | 830 | 810 |  |  | 410 | 360 | 420 | 370 |
| combustion test (UL-94) | — | V-0 | V-0 |  |  | V-0 | V-0 | V-0 | V-0 |
| critical molding cycle (cooling time) | second | 9 | 9 |  |  | 20 | 17 | 18 | 16 |
| flowability | mm | 420 | 430 |  |  | 380 | 400 | 470 | 490 |
| appearance inspection (specks) | — | ○ | ○ |  |  | ○ | ○ | ○ | ○ |
| discoloration of silver piece | — | Δ | Δ |  |  | Δ | Δ | ○ | ○ |
| discoloration under UV | YI | 32 | 33 |  |  | 30 | 31 | 55 | 55 |
| resin decomposition product |  | small | small |  |  | small | small | small | small |

As apparent from the foregoing description and the results obtained in the examples, the PBT composition of the present invention comprising a brominated epoxy resin type flame retardant and/or a brominated polycarbonate type flame retardant, a flame retardant assistant composed mainly of antimonyl pentoxide and/or antimony trioxide, and a hydrous basic carbonate compound of magnesium and aluminum, has the improved characteristics and well-balanced performances described below.

(1) At the molding step, the composition does not adhere to the surface of a mold and has an excellent heat stability, and therefore, the mold is not corroded by a decomposition product or the like and the molding efficiency is increased.

(2) The thermal deterioration of the molded article is controlled.

(3) A formation of specks differing in color in the molded article is not observed.

(4) The flame retardancy is very high and bleeding of the flame retardant does not occur during use.

(5) The mechanical properties such as tensile characteristics and Izod impact strength are high.

(6) The flowability is excellent, the solidification speed is high, and the molding cycle is shortened, and therefore, a high-cycle molding is possible.

(7) Corrosion or contamination of a co-present metal (contact) can be effectively controlled during use.

(8) The resistance to ultraviolet rays or high-temperature atmosphere is high, and a discoloration or reduction of the physical properties under ultraviolet rays or in a high-temperature atmosphere can be controlled.

(9) A formation of a resin decomposition product in a sealed high-temperature atmosphere is controlled, and an adhesion of the decomposition product to a contiguous part, or a contamination or discoloration of the contiguous part, can be controlled.

We claim:

1. A flame-retardant resin composition comprising (A) polybutylene terephthalate, a copolymer comprising at least 60.0% by weight of butylene terephthalate units and/or a thermoplastic polyester blend comprising at least 60.0% by weight of polybutylene terephthalate, (B) 2.0 to 25.0% by weight, based on the total composition, of a brominated epoxy resin type flame retardant and/or a brominated polycarbonate type flame retardant, (C) 2.0 to 15.0% by weight, based on the total composition, of a flame retardant assistant composed mainly of antimony trioxide and/or antimony pentoxide, (D) 0.01 to 10.0% by weight, based on the total composition, of a hydrous basic carbonate compound of magnesium and aluminum, and (E) 0 to 70.0% by weight, based on the total composition, of an inorganic filler.

2. A flame-retardant resin composition as set forth in claim 1, wherein the brominated epoxy resin type flame retardant (B) is a brominated epoxy resin type flame retardant comprising 100 parts by weight of a brominated bisphenol A type epoxy resin having a bromine content of at least 20% by weight, which is represented by the following general formula (I) and/or a modification product thereof in which a part or all of terminal glycidyl groups are blocked:

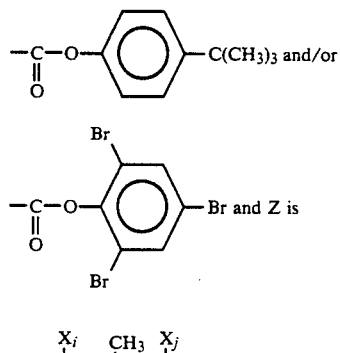

wherein X represents a bromine atom, i and j each represent an integer of from 1 to 4, and n represents the polymerization degree which is in the range of from 0 to 40, and 0.1 to 50 parts by weight of a polyalkylene ether derivative of a bromine-containing bisphenol having an alcoholic hydroxyl group, which is represented by the following general formula (II):

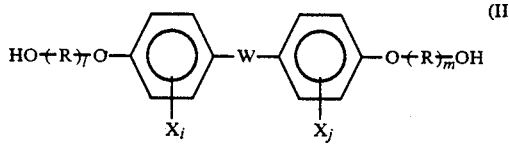

wherein x, i and j are as defined above, R represents ethylene-oxy group, as isopropylene-oxy group or a butylene-oxy group, l and m each represent an integer of from 1 to 5, and W represents —CH$_2$—,

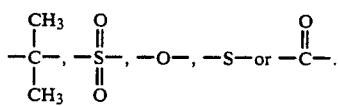

3. A flame-retardant resin composition as set forth in claim 1, wherein the brominated polycarbonate type flame retardant as the component (B) is a brominated bisphenol A type polycarbonate resin having a bromine content of at least 20% by weight, which is represented by the following general formula (III):

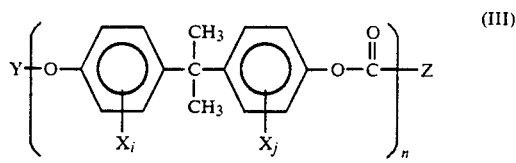

wherein X represents a bromine atom, i and j each represent an integer of from 1 to 4, n represents the average polymerization degree, which is in the range of from 2 to 30, and Y and Z each represent a terminal group, for example, Y is

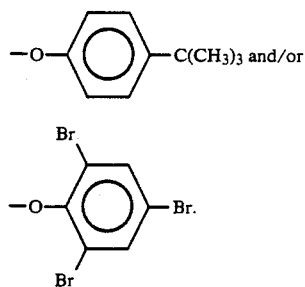

and Z is

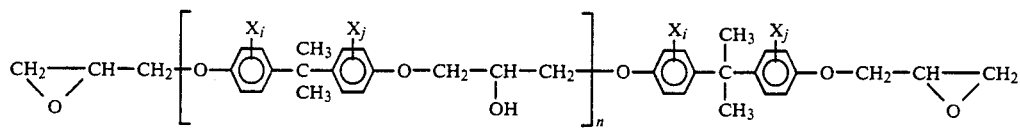

4. A flame-retardant resin composition as set forth in claim 1, wherein the flame retardant assistant composed mainly of antimony pentoxide as the component (C) is an antimony type flame assistant represented by the following general formula (IV):

$$(Na_2O)_p \cdot Sb_2O_5 \cdot qH_2O \qquad (IV)$$

wherein p is a number of from 0.4 to 0.9, and q represents the number of moles of water of crystallization, which is in the range of from 0 to 4.

5. A flame-retardant resin composition as set forth in claim 1, wherein the component (D) is a hydrotalcite compound represented by the following general formula (V):

$$Mg_{1-x}Al_x(OH)_2(CO_3)_{x/2} \cdot kH_2O \qquad (V)$$

wherein x is a number of from 0.2 to 0.4 and k is a number smaller than 2.

6. A flame-retardant resin composition as set forth in any of claims 1 through 5, which further comprises (F)

up to 2% by weight, based on the total composition, of an alkali metal salt or an alkaline earth metal salt.

7. A flame-retardant resin composition as set forth in claim 6, wherein the component (F) is a potassium salt.

8. A molded article for an electrical part, which is obtained by molding a flame-retardant resin composition as set forth in claim 1.

9. A molded article for an electrical part, which is obtained by molding a flame-retardant resin composition as set forth in claim 2.

10. A molded article for an electrical part, which is obtained by molding a flame-retardant resin composition as set forth in claim 3.

11. A molded article for an electrical part, which is obtained by molding a flame-retardant resin composition as set forth in claim 4.

12. A molded article for an electrical part, which is obtained by molding a flame-retardant resin composition as set forth in claim 5.

13. A molded article for an electrical part, which is obtained by molding a flame-retardant resin composition as set forth in claim 6.

14. A molded article for an electrical part, which is obtained by molding a flame-retardant resin composition as set forth in claim 7.

* * * * *